Patented Feb. 21, 1933　　　　　　　　　　　　　　　　　　　　1,898,329

UNITED STATES PATENT OFFICE

PERRY W. WILSON, OF TERRE HAUTE, INDIANA, ASSIGNOR TO COMMERCIAL SOLVENTS CORPORATION, OF TERRE HAUTE, INDIANA, A CORPORATION OF MARYLAND

PROPIONIC ACID FERMENTATION

No Drawing.　　　　　Application filed August 2, 1928.　Serial No. 297,093.

My invention relates to a method of obtaining propionic acid by fermentation. More specifically, my invention relates to a process for the production of propionic acid by the fermentation of protein-free or protein-deficient carbohydrate materials in the presence of nutrients in the form of distillery wastes such as yeast water, and the slops obtained as a by-product in the butyl-acetonic fermentation industry. More specifically still, my process relates to a process for the production of propionic acid and acetic acid by the fermentation of hydrolized starchy materials by the aid of the above-mentioned materials as nutrients.

It has been the custom in the past to prepare propionic acid by the fermentation of solutions of crude or pure lactose or other carbohydrate or mixture of carbohydrates; lactates or other fermentable organic salts. Of these materials, crude lactose obtained from whey has been generally regarded as the most suitable and practical raw material. Other sugars such as galactose, glucose, sucrose and maltose have been suggested as satisfactory raw materials when obtainable in suitable form and at a low enough price. The employment of these materials in the plant, however, has been impractical due to a number of factors such as cost, non-uniformity of composition, absence of certain essential constituents, etc. My new process overcomes difficulties experienced by previous investigators and provides a practical method of obtaining propionic acid and acetic acid from carbohydrates in the form of sugars which may be cheaply and practically produced.

A number of microorganisms have been recommended as propionic acid producers but the most suitable of these appears to be *Bacterium acidi propionici*, an organism isolated from Swiss cheese. It has also been the custom in the past to use with the propionic acid bacteria, organisms of another character known as "accelerator" organisms. These organisms, of which *Lactobacillus casei*, and *Proteus vulgaris* are examples, serve to markedly decrease the length of time necessary to complete a propionic acid fermentation. I may use these or any other form of microorganism recommended as suitable for the production of propionic acid and acetic acid, my new process not being confined to the use of any particular organism.

Like all protoplasmic bodies, bacteria consist of carbon, oxygen, hydrogen, and nitrogen, to which are added inorganic salts and varying quantities of phosphorus and sulphur. In order that bacteria may develop and multiply, therefore, they must be supplied with these substances in proper quantities and in forms suitable for assimilation. The first three materials named are present in the carbohydrate used as the raw material. Carbohydrates of a saccharine nature, however, such as glucose, dextrose, molasses, corn syrup, "hydrol" (the uncrystallized syrup from the boiling down of corn sugar, comprising a solution of glucose and dextrin) "wood juice" (the solution of mixed sugars obtained by the hydrolysis of wood, comprising pentoses, hexoses, hexose polymers, and undetermined carbohydrate substances), hydrolyzed starch solutions, hydrolyzed maize solutions, or malted grain solutions are usually deficient in nitrogen and other nutrient materials essential to bacterial growth. In a purely saccharine media such as presented by a glucose solution, or in a starch media, nitrogenous matter is absent, whereas in commercial or "black strap" "molasses" the nitrogenous materials required by the bacteria are sometimes, but not always, present.

I have now found that the "slop" or distillation residue obtained in the butyl-acetonic fermentation industry, after the removal of the butyl alcohol, acetone and ethyl alcohol formed in the process, serves as a very effective nutrient material in the propionic acid fermentation process. While the character of this slop varies somewhat, depending upon the type and amount of raw material employed in the butyl-acetonic fermentation process, the data given below show its average composition when maize is used as the raw material.

|  | Total dry solids | Soluble dry solids | Insoluble dry solids |
|---|---|---|---|
| Dry substance in 100 cc | 1.617 gm. | 1.046 gm. | 0.571 gm. |
| Nitrogen | 5.54% | 4.88% | 6.76% |
| Nitrogen as protein | 34.6 % | 30.5 % | 42.2 % |
| Ash | 9.3 % | 14.0 % | 1.7 % |

The nitrogen present in butyl-acetonic slops is probably present in the form of proteoses, peptones, peptides, amino acids, ammonia, etc.

Another material which I have found to be suitable as a nutrient is propionic acid fermentation is the distillery waste obtained from ethyl alcohol fermentation or yeast production. Both of the latter processes are generally carried out with substantially the same materials, but in one case the fermentation is conducted in such a manner as to obtain as much ethyl alcohol as possible, whereas in the other large yields of yeast are desired instead of ethyl alcohol. The ethyl alcohol is usually separated from the fermented mash by the customary methods of distillation, whereas the yeast is usually separated by some such method as centrifuging. The residue in either case contains considerable amounts of yeast and other materials which are suitable for use as nutrients in the propionic acid fermentation. This yeast remaining from the processes of fermentation is "degraded" by means of steam or by water heated under pressure. Or, if desired, a similar product may be obtained by mixing yeast with water, sterilizing, cooling, and fermenting with an organism of the type of *Tyrothrix tenuis* in the presence of air. By either of these processes at least ninety per cent of the nitrogenous matter of the yeast is converted into a soluble form which readily serves as a source of nitrogen for the propionic acid bacteria.

While my invention is applicable to the utilization of protein-free or protein-deficient carbohydrates generally, I shall describe in detail but one example—i. e., the fermentation of hydrolyzed starch.

Five per cent of corn starch is added to butyl-acetonic slops and the resulting mixture hydrolyzed by heating for approximately one hour at 15–20 lbs. pressure with approximately 1% hydrochloric acid. The sugar solution thus obtained is neutralized to pH 6.0–7.0 with sodium hydroxide or other suitable alkaline media. The mixture is then sterilized for one-half hour at 15 lbs. steam pressure and run thru coolers into the fermentation vats where it is inoculated. The inoculum preferably consists of 5% of a propionic acid culture and 0.05% of a lactic acid culture (accelerator organism) or 5% of a culture consisting of only propionic acid organisms. In carrying out industrial scale operations in 50,000 gallon fermenters, it is preferred to place 10,000 gallons of mash in each of a series of fermenters, inoculate, and then make subsequent additions of mash consisting of about 10,000 gallons each, as prepared, until the desired amount has been placed in each fermenter. When proper precautions are taken to avoid contamination of the freshly hydrolized starch and a vigorous culture of the propionic acid organism is employed, the sterilization step may be omitted, if found desirable. However, as a means of safety, it is usually advisable to sterilize.

It has been found that, in general, organisms which produce acids during the course of a fermentation become less and less active as the concentration of acid in the media increases. After a certain point is reached the action of the bacteria becomes negligible unless the acid is removed from the media. Such a condition is met with in propionic acid fermentation. In order to prevent the media from becoming too acid, sufficient powdered calcium carbonate or other insoluble alkaline earth compound, is added to the media at the beginning of the fermentation to neutralize all of the acids formed during the course of the fermentation. Or, if preferred, smaller additions may be made each day instead of all at one time. In either case, thorough agitation should be resorted to at frequent intervals. If desired, the acids may be neutralized by soluble alkaline materials such as compounds of alkali metals or equivalent alkaline compounds. In this case, however, it is necessary to add the neutralizing agent at more frequent intervals in order to prevent making the media too alkaline, it being highly desirable to control the acidity of the media so that the hydrogen ion concentration is maintained preferably within the limits $10^{-7}$ and $10^{-5}$ within the bulk of the mash.

When using a 5% sugar solution, the fermentation is ordinarily completed in from 7 to 10 days. The first 60 to 80% of the sugar seems to be consumed during the first 4 or 5 days, the remainder of the time being required for the conversion of the remaining small portion of the sugar.

At the conclusion of the fermentation, the neutralized salts formed during the process are recovered and the desired propionic acid, acetic acid, etc., obtained by distilling with sulphuric acid.

During the course of the fermentation, propionic acid and acetic acid, in the proportions ranging from 1½ to 1, to 2 of the former to 1 of the latter, are formed. In addition to volatile acids, often about 25% of the sugar fermented is converted to lactic acid.

The table given below shows the yields of total volatile acids obtained by my new process in a number of experimental runs.

3% hydrolyzed starch + butyl-acetonic slop 30.4%–37.9%
(50%)
3% hydrolyzed starch + butyl-acetonic slop 48.5%–68.3%
(100%)
5% hydrolyzed starch + butyl-acetonic slop 47.0%
(100%)
3% hydrolyzed starch + yeast water 36.6%–51.0%

100% butyl-acetonic slop appears to be the optimum amount to be used but when the mash is made up with this concentration of slop in place of water, difficulties are experienced in the hydrolysis of the starch due to buffering action. Due to this fact, it is desirable to hydrolyze the starch alone in, say a 25% suspension and add the slop later.

While I have only described above the use of butyl-acetonic slop and yeast water, it is distinctly understood that I do not confine myself to the use of only these materials but may use also any other suitable form of distillery waste. I also may use these materials with other protein-free or protein-deficient carbohydrate forms than those which have been cited above merely as examples of methods of carrying out my improved process of obtaining propionic acid and acetic acid by fermentation.

Now having described my invention, what I claim as new and novel is:

1. A process for the production of propionic acid from a mash containing protein-free carbohydrates which comprises subjecting such mash to the action of bacteria capable of producing propionic acid, controlling the acidity of the mash so that the hydrogen ion concentration is maintained preferably within the limits $10^{-7}$ and $10^{-5}$ measured in the bulk of the mash, and effecting the nutrient requirements of the said bacteria at least in part by the addition of a substantial proportion of a material selected from the group consisting of butyl-acetonic fermentation slop, ethyl alcohol fermentation slop, yeast fermentation residue and degraded yeast.

2. A process for the production of propionic acid from a mash containing protein-free carbohydrates which comprises subjecting such mash to the action of bacteria capable of producing propionic acid, controlling the acidity of the mash so that the hydrogen ion concentration is maintained preferably within the limits $10^{-7}$ and $10^{-5}$ measured in the bulk of the mash, and effecting the nutrient requirements of the said bacteria at least in part by the addition of a substantial proportion of butyl-acetonic fermentation slop.

3. A process for the production of propionic acid from a mash containing protein-deficient carbohydrates which comprises subjecting such mash to the action of bacteria capable of producing propionic acid, controlling the acidity of the mash so that the hydrogen ion concentration is maintained preferably within the limits $10^{-7}$ and $10^{-5}$ measured in the bulk of the mash, and effecting the nutrient requirements of the said bacteria at least in part by the addition of a substantial proportion of a material selected from the group consisting of butyl-acetonic fermentation slop, ethyl alcohol fermentation slop, yeast fermentation residue and degraded yeast.

4. A process for the production of propionic acid from a mash containing protein-deficient carbohydrates which comprises subjecting such mash to the action of bacteria capable of producing propionic acid, controlling the acidity of the mash so that the hydrogen ion concentration is maintained preferably within the limits $10^{-7}$ and $10^{-5}$ measured in the bulk of the mash, and effecting the nutrient requirements of the said bacteria at least in part by the addition of a substantial proportion of butyl-acetonic fermentation slop.

5. A process for the production of propionic acid from a mash containing protein-free carbohydrates which comprises subjecting such mash to the action of bacteria capable of producing propionic acid, controlling the acidity of the mash so that the hydrogen ion concentration is maintained preferably within the limits $10^{-7}$ and $10^{-5}$ measured in the bulk of the mash, by the use of at least one material chosen from the group consisting of alkaline compounds of alkali metals and alkaline earth metals, and effecting the nutrient requirements of the said bacteria at least in part by the addition of a substantial proportion of a material selected from the group consisting of butyl-acetonic fermentation slop, ethyl alcohol fermentation slop, yeast fermentation residue and degraded yeast.

6. A process for the production of propionic acid from a mash containing protein-deficient carbohydrates which comprises subjecting such mash to the action of bacteria capable of producing propionic acid, controlling the acidity of the mash so that the hydrogen ion concentration is maintained preferably within the limits $10^{-7}$ and $10^{-5}$ measured within the bulk of the mash by the use of at least one material chosen from the group consisting of alkaline compounds of alkali metals, alkaline earth metals, and effecting the nutrient requirements of the said bacteria at least in part by the addition of a substantial proportion of a material selected from the group consisting of butyl-acetonic fermentation slop, ethyl alcohol fermentation slop, yeast fermentation residue and degraded yeast.

7. In a process for the production of propionic acid by fermentation, the steps which comprise employing as the raw material a mash containing carbohydrates free from proteins and a substantial proportion of a material selected from the group consisting of butyl-acetonic fermentation slop, ethyl alcohol fermentation slop, yeast fermentation residue and degraded yeast.

8. In a process for the production of propionic acid by fermentation, the steps which comprise employing as a raw material a mash containing carbohydrates deficient in proteins and a substantial proportion of a material selected from the group consisting of butyl-acetonic fermentation slop, ethyl alcohol fermentation slop, yeast fermentation residue and degraded yeast.

9. In a process for the production of propionic acid by fermentation, the steps which comprise employing as the raw material a mash containing hydrolyzed starchy materials and a substantial proportion of a material selected from the group consisting of butyl-acetonic fermentation slop, ethyl alcohol fermentation slop, yeast fermentation residue and degraded yeast.

10. In a process for the production of propionic acid by fermentation, the steps which comprise employing as the raw material a mash containing hydrolyzed starch and a substantial proportion of a material selected from the group consisting of butyl-acetonic fermentation slop, the ethyl alcohol fermentation slop, yeast fermentation residue and degraded yeast.

In testimony whereof I affix my signature.

PERRY W. WILSON.